United States Patent
Boss et al.

(10) Patent No.: US 10,121,016 B2
(45) Date of Patent: Nov. 6, 2018

(54) MANAGING ACCESS TO DEVICE CONTENT (71) Applicant: International Business Machines Corporation, Armonk, NY (US)

(72) Inventors: Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 14/675,834

(22) Filed: Apr. 1, 2015

(65) Prior Publication Data

US 2016/0292435 A1 Oct. 6, 2016

(51) Int. Cl.
*G06F 21/62* (2013.01)
*H04W 4/021* (2018.01)
(Continued)

(52) U.S. Cl.
CPC ..... *G06F 21/6209* (2013.01); *G06Q 10/1093* (2013.01); *H04M 1/72566* (2013.01); *H04W 4/021* (2013.01); *G06F 21/62* (2013.01); *G06F 2221/2115* (2013.01); *G06F 2221/2141* (2013.01); *H04B 1/38* (2013.01);
(Continued)

(58) Field of Classification Search
CPC . G06F 21/62; H04M 3/00; H04B 1/38; H04B 7/00
See application file for complete search history.

(56) References Cited

U.S. PATENT DOCUMENTS 6,973,333 B1 * 12/2005 O'Neil .............. H04W 4/046
340/425.5
8,787,936 B2 7/2014 Tibbitts et al.
(Continued)

FOREIGN PATENT DOCUMENTS

WO 2009105666 A1 8/2009
WO 2010042545 A2 4/2010

OTHER PUBLICATIONS

National Safety Council, Focus on the Drive, Quarterly Newsletter, NSC Issue No. 16, Summer 2014.*
(Continued)

*Primary Examiner* — Carl G Colin
*Assistant Examiner* — Vance M Little
(74) *Attorney, Agent, or Firm* — Gilbert Harmon, Jr.

(57) ABSTRACT

A method for managing access to a device includes receiving restriction information and access to a user's calendar, scanning the calendars for entries corresponding to travel, determining if the user is prohibited from accessing content on a device, and accordingly denying the user access to the content on the device in response to determining that the user is not in compliance with the restriction information. The restriction information indicates requirements a user must comply with to access content with a device, as well as which content is regulated by said requirements. The requirements indicated by the restriction information include a timeframe around and including a calendar entry corresponding to travel during which the user is denied access to content. A computer program product and a computer system corresponding to the method are also disclosed.

14 Claims, 4 Drawing Sheets

(51) Int. Cl.
  *H04M 1/725* (2006.01)
  *G06Q 10/10* (2012.01)
  *H04B 1/38* (2015.01)
  *H04B 7/00* (2006.01)
  *H04W 4/02* (2018.01)
  *H04M 1/67* (2006.01)

(52) U.S. Cl.
  CPC .............. *H04B 7/00* (2013.01); *H04M 1/67* (2013.01); *H04W 4/027* (2013.01)

(56) References Cited

U.S. PATENT DOCUMENTS

| | | | |
|---|---|---|---|
| 8,890,673 B2 | 11/2014 | Catten et al. | |
| 2005/0255874 A1 | 11/2005 | Stewart-Baxter et al. | |
| 2006/0099940 A1 | 5/2006 | Pfleging et al. | |
| 2009/0012798 A1* | 1/2009 | McConnell | G06F 17/30241 |
| | | | 705/4 |
| 2011/0021234 A1* | 1/2011 | Tibbitts | H04W 48/04 |
| | | | 455/517 |
| 2012/0284779 A1* | 11/2012 | Ingrassia, Jr. | G06F 21/70 |
| | | | 726/5 |
| 2013/0072174 A1 | 3/2013 | Enty et al. | |
| 2013/0159185 A1* | 6/2013 | Lee | G06Q 40/02 |
| | | | 705/44 |
| 2016/0182663 A1* | 6/2016 | Boyette | H04L 63/20 |
| | | | 726/1 |

OTHER PUBLICATIONS

FAQs for Renting Cars on Official Travel, Referencing US Government Car Rental Agreement No. 4, Defense Travel Management Office, Effective Oct. 15, 2010.*

Stewart, Marie, "Sensing motion in a mobile phone and limiting functionality of moving phones", submitted to Distracted Driving Foundation, Jun. 20, 2010, pp. 1-5.

"An Employers Liability for Employee's Acts", FindLaw® A Thomson Reuters Business, Copyright © 2013 FindLaw, a Thomas Reuters Business, pp. 1-3, <http://smallbusiness.findlaw.com/liability-and-insurance/an-employer-s-liability-for-employee-s-acts.html>.

* cited by examiner

MANAGING ACCESS TO DEVICE CONTENT

BACKGROUND OF THE INVENTION

The present invention relates generally to the field of content protection, and more specifically to selectively allowing or denying a user to access content with a device.

Employees of companies are using smartphones and other devices to conduct business around the clock. Some of these companies are experiencing legal problems when an employee is involved in an accident while conducting company business on a device and operating a vehicle simultaneously. While many companies have Human Resource policies about the use of smartphones while driving, they do not use technology to enforce these policies. Beyond the corporate sphere, parents who give their children cell phones are forced to trust that they will not use them while they drive, without means to enforce that rule.

SUMMARY

As disclosed herein, a method for managing access to a device includes receiving restriction information and access to a user's calendar, scanning the calendars for entries corresponding to travel, determining if the user is prohibited from accessing content on a device, and accordingly denying the user access to the content on the device in response to determining that the user is not in compliance with the restriction information. The restriction information indicates requirements a user must comply with to access content with a device, as well as which content is regulated by said requirements. The requirements indicated by the restriction information include a timeframe around and including a calendar entry corresponding to travel during which the user is denied access to content. A computer program product and a computer system corresponding to the method are also disclosed.

DETAILED DESCRIPTION

Legal issues often occur when employees are involved in accidents while simultaneously conducting company business and operating a vehicle. The method disclosed herein leverages existing global positioning system (GPS) technologies and widely used calendar services in conjunction with a centrally managed set of restriction information to detect if a user is operating a vehicle, and accordingly deny the user access to content if necessary.

Figure 1:
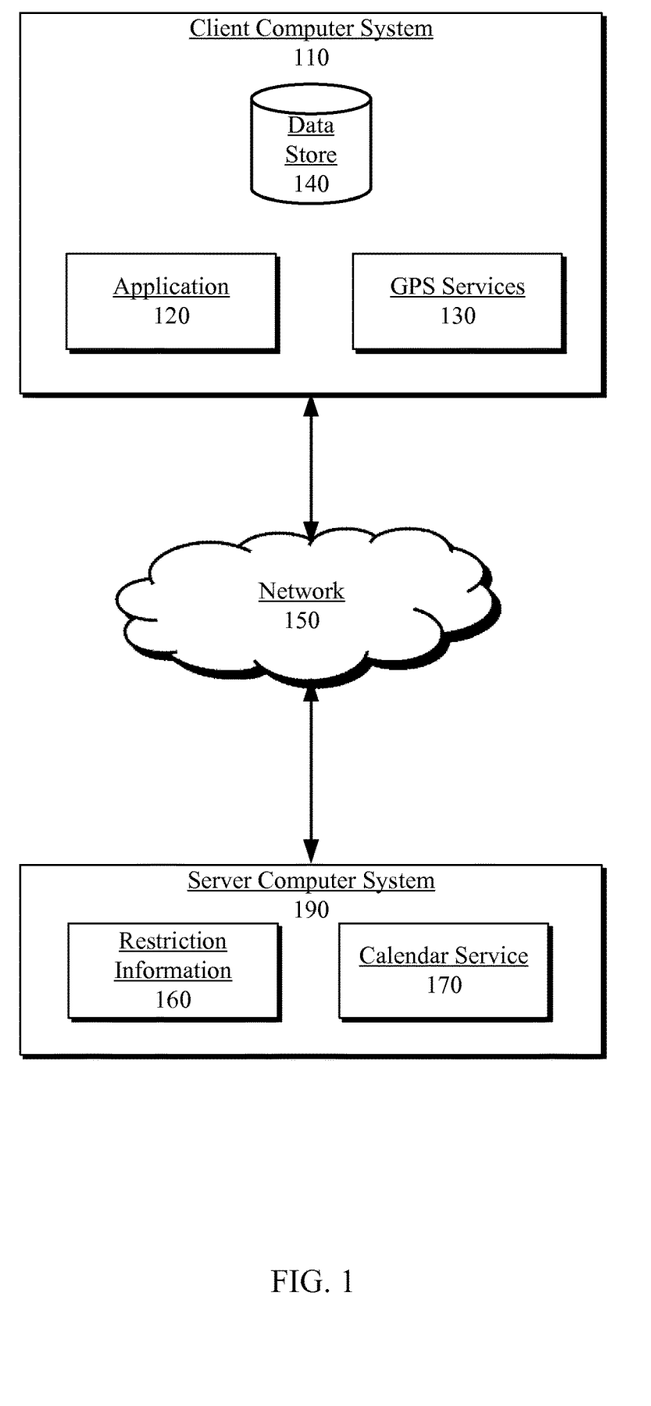
FIG. 1 is a functional block diagram depicting a computing environment in accordance with some embodiments of the present invention.

FIG. 1 is a functional block diagram depicting a computing environment 100 in accordance with an embodiment of the present invention. Computing environment 100 includes client computer system 110 and server computer system 190, which can be desktop computers, laptop computers, specialized computer servers, or any other computer systems known in the art. In some embodiments, client computer system 110 and server computer system 190 represent computer systems utilizing clustered computers and components to act as a single pool of seamless resources when accessed through network 150. In general, client computer system 110 and server computer system 190 are representative of any electronic devices, or combination of electronic devices, capable of executing machine-readable program instructions, as described in greater detail with regard to FIG. 4.

Client computer system 110 may include application 120, GPS services 130, and data store 140. GPS services 130 may be any currently available GPS technology implementable on a user device and capable of determining the location of the device, as well as the speed at which the device is moving. GPS services 130 may provide this speed and location information to application 120.

Application 120 may be configured to scan user calendars and additionally to determine whether or not to allow a user to access to additional content on client computer system 110. A more detailed description of an access management method as executed by one embodiment of the application 120 is included with respect to FIG. 2. Scanning user calendars may include accessing calendars stored on data store 140 or calendars available through calendar service 170 via network 150. Application 120 enables client computer system 110 to access calendar services 170 as well as restriction information 160. Application 120 communicates with server computer system 190 via network 150 (e.g. using TCP/IP).

Figure 2:
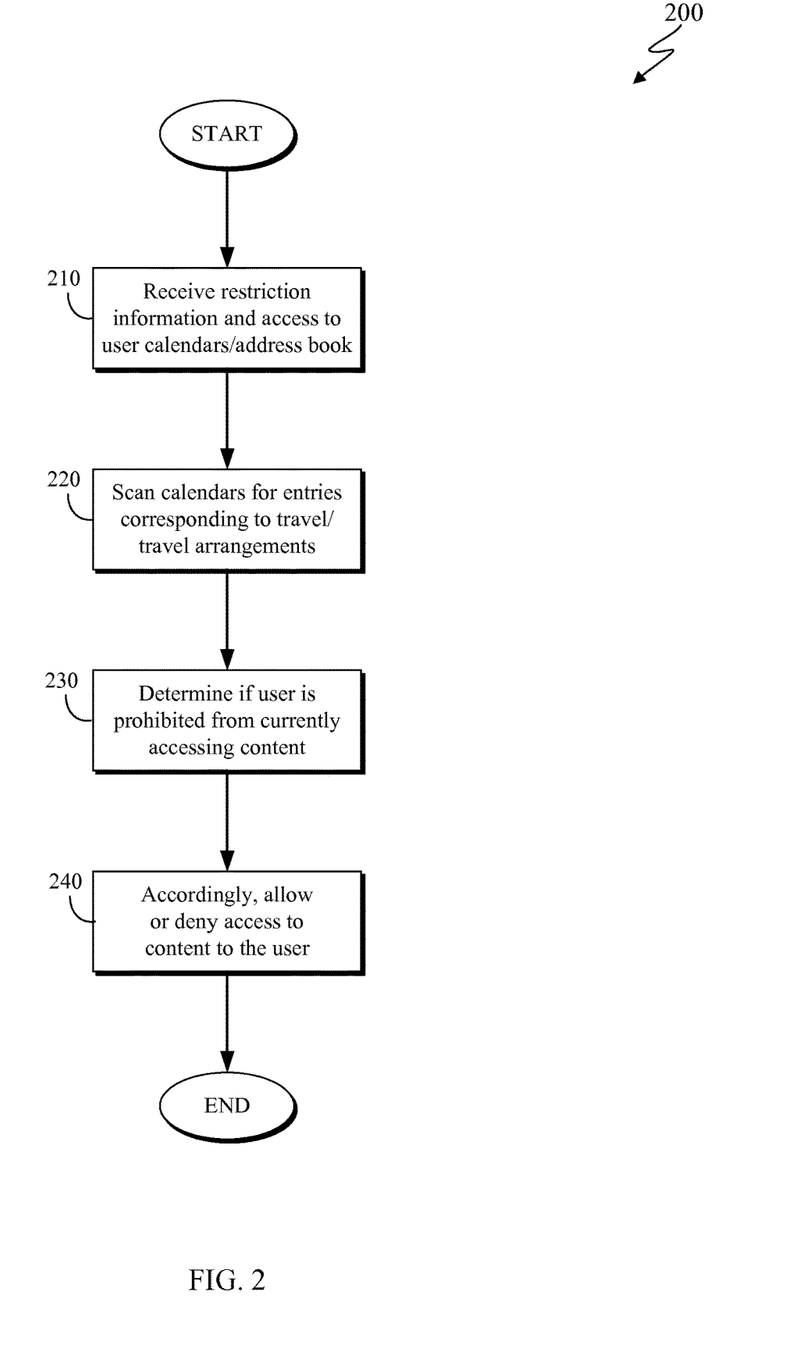
FIG. 2 is a flowchart depicting an access management method in accordance with some embodiments of the present invention.

Data store 140 may store user calendars or profile information corresponding to access management method 200 (as depicted in FIG. 2). Data store 140 may be any non-volatile storage media known in the art. For example, data store 140 can be implemented with a tape library, optical library, one or more independent hard disk drives, or multiple hard disk drives in a redundant array of independent disks (RAID). Similarly, data on data store 140 may conform to any suitable storage architecture known in the art, such as a file, a relational database, an object-oriented database, and/or one or more tables.

The depicted server computer system 190 includes restriction information 160 and calendar service 170. Calendar service 170 may be a web-based calendar service available to application 120 via network 150. Restriction information 160 may be a set of regulations that indicate how access to a device may be managed. More information regarding the restriction information 160 is addressed with respect to operational step 210 of FIG. 2.

Network 150 can be, for example, a local area network (LAN), a wide area network (WAN) such as the Internet, or a combination of the two, and include wired, wireless, or fiber optic connections. In general, network 150 can be any combination of connections and protocols that will support communications between server computer system 190 and client computer system 110 in accordance with an embodiment of the present invention.

FIG. 2 depicts an access management method 200. As depicted, the access management method 200 includes receiving (210) restriction information and access to user calendars, scanning (220) calendars for entries corresponding to travel or travel arrangements, determining (230) if a user is prohibited from currently accessing content on a device, and accordingly allowing or denying (240) the user access to the content on the device. The access management method 200 may be used to ensure a user is able to access his or her device only under allowable conditions.

Receiving (210) restriction information and access to user calendars may include receiving information regarding what content is regulated via the method as well as permissions to access a user's calendars. The restriction information may indicate, for example, that the method is initiated when a user tries to access his/her email or messaging content, but is not initiated if a user tries to access his/her music. In one embodiment, restriction information indicates that only corporate content on a user's device is regulated. Restriction information may also include information pertaining to under what circumstances access is restricted. For example, the restriction information could indicate that if the device is traveling at a speed of greater than 10 MPH, or if the user's calendars indicate that he/she is currently traveling via car, then access to the specified content will be restricted.

Scanning (220) calendars for entries corresponding to travel or travel arrangements may include accessing calendar data to isolate calendar entries that indicate a user will be traveling. In one embodiment, a user may be required by an employer to include information regarding travel plans on his/her calendar such that the method will be able to monitor all instances of travel. Additionally, a user may be required to include rental car or hotel information where applicable, and this information may be used as described with respect to operational step 350 of FIG. 3.

Determining (230) if a user is prohibited from currently accessing content with a device may include executing an access determination method to decide whether or not a user is in compliance with the restriction information. A more detailed description of an access determination method is discussed with respect to FIG. 3.

Accordingly allowing or denying (240) the user access to the content on the device may include either allowing or denying access to the user based on the determination made in operational step 230. Details regarding allowing or denying access are discussed with regard to operational steps 370 and 350 of FIG. 3, respectively.

Figure 3:
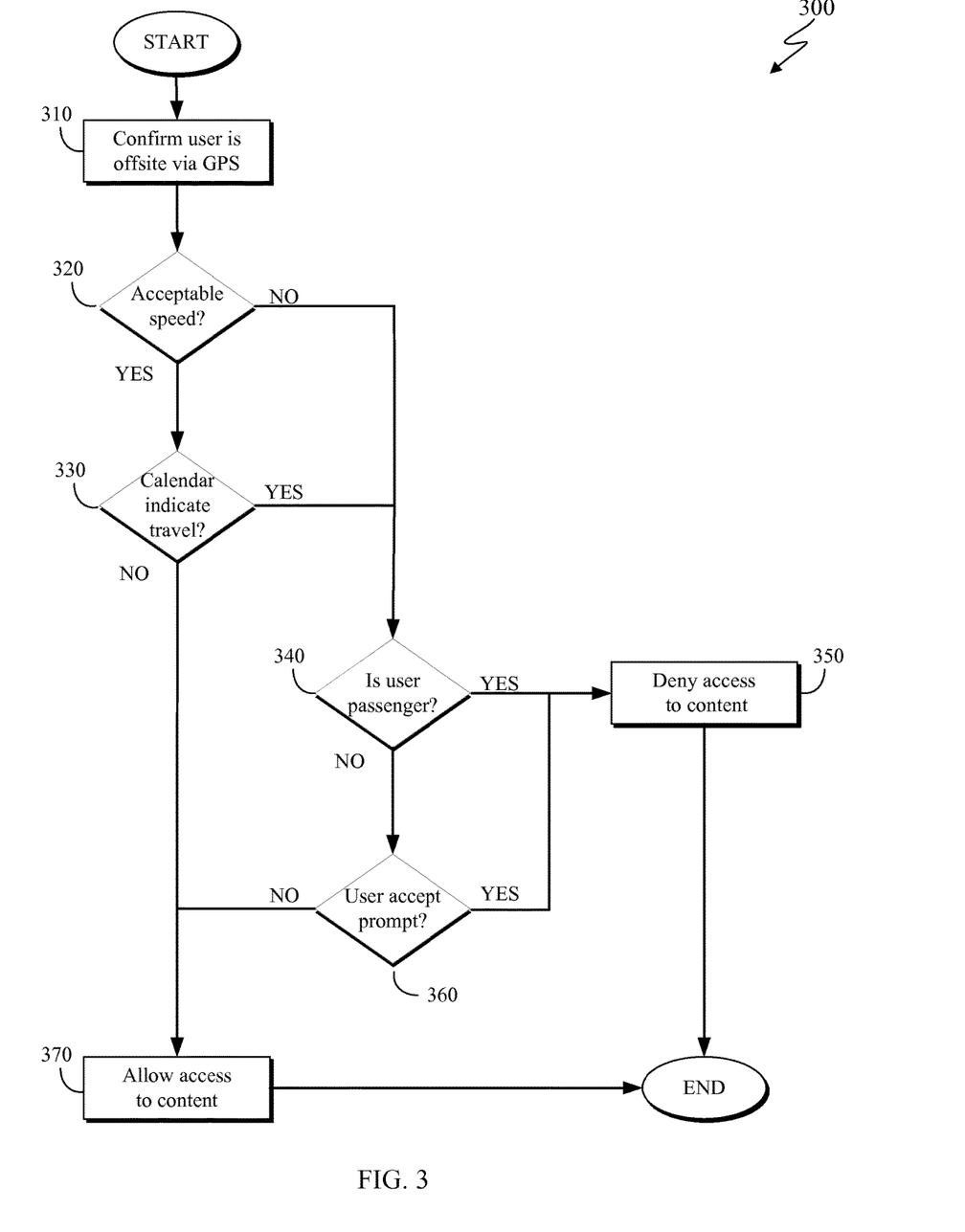
FIG. 3 is a flowchart depicting an access determination method in accordance with some embodiments of the present invention.

FIG. 3 is a flowchart depicting operational steps of an access determination method 300 in accordance with one embodiment of the present invention. As depicted, the access determination method 300 includes confirming (310) a user is offsite, detecting (320) whether the user is traveling at an acceptable speed, determining (330) whether the user's calendar indicates that the user is travelling, prompting (340) the user to indicate whether he/she is a passenger, denying (350) access to content on a device, prompting (360) the user to accept liability, and allowing (370) access to content on the device. The access determination method 300 may be used to determine whether or not a user is attempting to access content on a device under a set of acceptable conditions.

Confirming (310) a user is offsite may include using GPS services on a user's device to determine whether or not the user is considered to be offsite. Offsite may correspond to locations not defined as normal by the restriction information; for example, a user's place of employment as well as their place of residence may be indicated in the restriction information, and if the user is at one of these locations, the method will terminate and the user will be allowed access. Otherwise, the method continues by detecting (320) whether the user's device is traveling at an acceptable speed.

Detecting (320) whether the user's device is traveling at an acceptable speed may include utilizing existing speed detection techniques to determine if the user's device is moving at a speed greater than a previously indicated acceptable threshold (e.g., 10 MPH). In one embodiment, the acceptable speed threshold may be indicated in the restriction information. If the device is not traveling at an acceptable speed (320, no branch), then the method continues to prompting (340) the user to indicate whether he/she is a passenger in a vehicle. If the device is traveling at an acceptable speed, or if GPS services are not enabled on the device and no speed is detected (320, no branch), then the method continues by determining (330) whether the user's calendar indicates that the user is travelling.

Determining (330) whether the user's calendar indicates that the user is travelling may include determining if an entry in the calendar(s) scanned with regard to operational step 220 from FIG. 2 corresponds to user travel at the time of the determination. In one embodiment, the determination operation 330 may consider any calendar entries corresponding to travel within a configurable amount of time (1 hour, 2 hours, etc.) of the determination to be indicative of current user travel. If the user is determined to be traveling based on his/her calendar(s) (330, yes branch), the method continues by prompting (340) the user to indicate whether he/she is a passenger in a vehicle. If no current calendar entries corresponding to travel are found (330, no branch), the method continues by allowing (370) access to content on the device.

Prompting (340) the user to indicate whether he/she is a passenger in a vehicle may include enabling the user to indicate via an interface whether or not he/she is a passenger in a vehicle. If a user is travelling via taxi or carpooling with a coworker who is driving, then he/she may be above the acceptable speed threshold and his/her calendar may also indicate travel, but it may not be desirable to deny the user access to content in this situation. Therefore, the user is given the option to indicate that he/she is not operating the vehicle he/she is traveling in. In one embodiment, the user makes this indication via a graphical user interface (GUI). If the user indicates that he/she is a passenger (340, yes branch), then the method continues by prompting (360) the user to accept liability. If the user indicates that he/she is not a passenger (340, no branch), then the method continues by denying (350) access to content.

Denying (350) access to content on a device may include not opening the content the user attempted to access. In one embodiment, denying (350) access to content may further include denying the user the ability to access the content for a configurable period of time. In another embodiment, access to all content regulated by the restrictions information may be disabled, not just the content the user attempted to access. In an embodiment where a user has indicated that he/she will be traveling from an airport to a hotel via a rental car, a corporate credit card may be linked to the application 120, and the user may be denied access to regulated content beginning when the card is used to pay for the rental car and ending when the card is used to check in at the hotel.

Prompting (360) the user to accept liability may include prompting the user to interact with an interface to indicate that in the case where he/she has falsely claimed to be a passenger, he/she accepts liability for any accident that may occur. In one embodiment, the user may additionally be prompted to agree not to hold their employer to be liable in any way. If the user accepts/agrees (360, yes branch), the method continues to allowing (370) access to content. If the user does not accept/agree (360, no branch), the method continues Allowing (370) access to content on the device may include allowing the user to access content by opening the content normally. In one embodiment, allowing (370) access to content on the device includes allowing access to the content as would occur if the method were not present.

Figure 4:
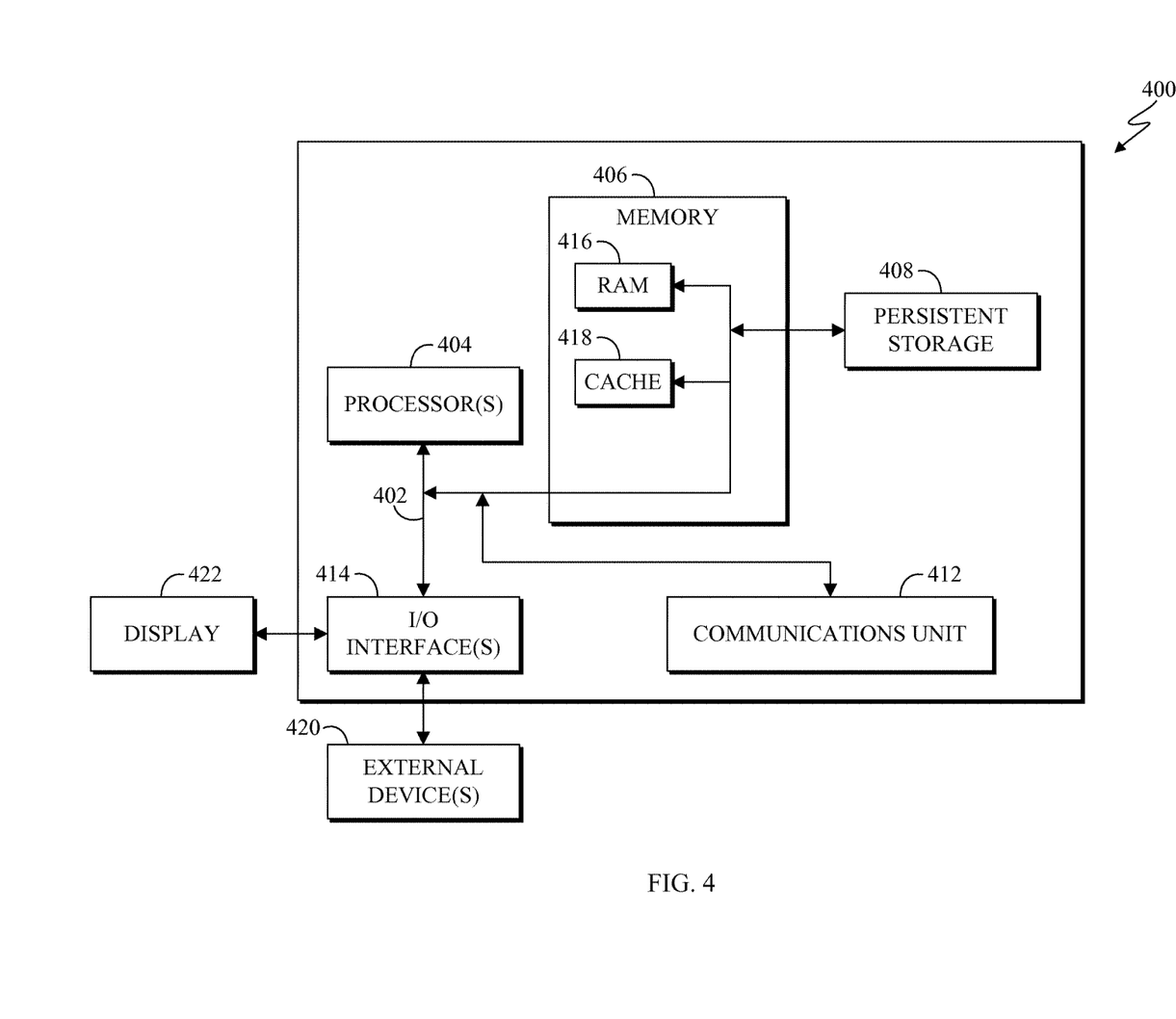
FIG. 4 depicts a block diagram of components of computer in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing access to content with a device, the method comprising:
    receiving restriction information and access to a user's calendar, wherein the restriction information indicates requirements a user must comply with to access content with the device, as well as which content is regulated by said requirements, wherein the requirements include a denial timeframe around and including a calendar entry corresponding to travel during which the user is denied access to content, and wherein the denial timeframe begins when the user's credit card is used at a first location and ends when the user's credit card is used at a second location;
    scanning one or more user calendars for entries corresponding to travel to identify one or more travel events;
    creating updated restriction information according to the one or more identified travel events, wherein the updated restriction information includes one or more time periods during which the user is denied access to content according to an identified travel event, the denial timeframe indicated by the restriction information, and one or more locations corresponding to the identified travel events where access to the content is disabled;
    determining GPS coordinates corresponding to the device;
    determining, based on the determined GPS coordinates corresponding to the device if the user is in compliance with the updated restriction information; and
    responsive to determining that the user is in compliance with the updated restriction information, providing the regulated content to the user via the device.

2. The method of claim 1, wherein the content that is regulated by the requirements corresponds to corporate content available via the device.

3. The method of claim 1, further comprising allowing access to the content with the device in response to determining that the user is in compliance with the restriction information.

4. The method of claim 1, wherein the restriction information indicates the user is denied access to content for a selected time interval if the user's calendar indicates that the user is traveling via a rental car to a hotel.

5. The method of claim 1, wherein the requirements indicated by the restriction information correspond to corporate policies regarding access to content with the device.

6. The method of claim 1, wherein the restriction information indicates the user is denied access to content if the device is moving faster than a configurable maximum speed threshold.

7. A computer program product comprising:
one or more computer readable storage media and program instructions stored on the one or more computer readable storage media, the program instructions comprising instructions to:
receive restriction information and access to a user's calendar, wherein the restriction information indicates requirements a user must comply with to access content with the device, as well as which content is regulated by said requirements, wherein the requirements include a denial timeframe around and including a calendar entry corresponding to travel during which the user is denied access to content, and wherein the denial timeframe begins when the user's credit card is used at a first location and ends when the user's credit card is used at a second location;
scan one or more user calendars for entries corresponding to travel to identify one or more travel events;
create updated restriction information according to the one or more identified travel events, wherein the updated restriction information includes one or more time periods during which the user is denied access to content according to an identified travel event, the denial timeframe indicated by the restriction information, and one or more locations corresponding to the identified travel events where access to the content is disabled;
determine GPS coordinates corresponding to the device;
determine, based on the determined GPS coordinates corresponding to the device, if the user is in compliance with the updated restriction information; and
responsive to determining that the user is in compliance with the updated restriction information, provide the regulated content to the user via the device.

8. The computer program product of claim 7, wherein the restriction information indicates the user is denied access to content if the device is moving faster than a configurable maximum speed threshold.

9. The computer program product of claim 7, wherein the program instructions further comprise instructions to allow access to the content with the device in response to determining that the user is in compliance with the restriction information.

10. The computer program product of claim 7, wherein the restriction information indicates the user is denied access to content for a selected time interval if the user's calendar indicates that the user is traveling via a rental car to a hotel.

11. A computer system comprising:
one or more computer processors;
one or more computer-readable storage media;
program instructions stored on the computer-readable storage media for execution by at least one of the one or more processors, the program instructions comprising instructions to:
receive restriction information and access to a user's calendar, wherein the restriction information indicates requirements a user must comply with to access content with the device, as well as which content is regulated by said requirements, wherein the requirements include a denial timeframe around and including a calendar entry corresponding to travel during which the user is denied access to content, and wherein the denial timeframe begins when the user's credit card is used at a first location and ends when the user's credit card is used at a second location;
scan one or more user calendars for entries corresponding to travel to identify one or more travel events;
create updated restriction information according to the one or more identified travel events, wherein the updated restriction information includes one or more time periods during which the user is denied access to content according to an identified travel event, the denial timeframe indicated by the restriction information, and one or more locations corresponding to the identified travel events where access to the content is disabled;
determine GPS coordinates corresponding to the device;
determine, based on the determined GPS coordinates corresponding to the device, if the user is in compliance with the updated restriction information; and
responsive to determining that the user is in compliance with the updated restriction information, provide the regulated content to the user via the device.

12. The computer system of claim 11, wherein the restriction information indicates the user is denied access to content if the device is moving faster than a configurable maximum speed threshold.

13. The computer system of claim 11, wherein the program instructions further comprise instructions to allow access to the content with the device in response to determining that the user is in compliance with the restriction information.

14. The computer system of claim 11, wherein the restriction information indicates the user is denied access to content for a selected time interval if the user's calendar indicates that the user is traveling via a rental car to a hotel.

* * * * *